(12) United States Patent
Sano et al.

(10) Patent No.: US 8,445,135 B2
(45) Date of Patent: May 21, 2013

(54) METHOD OF MANUFACTURING ACTIVE MATERIAL, ACTIVE MATERIAL, ELECTRODE, AND LITHIUM-ION SECONDARY BATTERY

(75) Inventors: Atsushi Sano, Tokyo (JP); Keitaro Otsuki, Tokyo (JP); Yosuke Miyaki, Tokyo (JP); Takeshi Takahashi, Tokyo (JP); Tohru Inoue, Tokyo (JP); Akiji Higuchi, Kyoto (JP)

(73) Assignee: TDK Corporation, Tokyo (JP)

( * ) Notice: Subject to any disclaimer, the term of this patent is extended or adjusted under 35 U.S.C. 154(b) by 436 days.

(21) Appl. No.: 12/722,976

(22) Filed: Mar. 12, 2010

(65) Prior Publication Data

US 2010/0233544 A1    Sep. 16, 2010

(30) Foreign Application Priority Data

Mar. 16, 2009    (JP) ................ P2009-062990

(51) Int. Cl.
*H01M 4/48*    (2010.01)
(52) U.S. Cl.
USPC ............... 429/231.5; 429/231.2; 423/306
(58) Field of Classification Search
USPC ............... 429/231.5, 231.2; 423/306
See application file for complete search history.

(56) References Cited

U.S. PATENT DOCUMENTS 7,338,647 B2 *    3/2008    Huang et al. .............. 423/306

FOREIGN PATENT DOCUMENTS

| CN | 1011101986 A | 1/2008 |
| JP | A-2003-68304 | 3/2003 |
| JP | A-2004-303527 | 10/2004 |
| WO | WO 2008/060701 A2 | 5/2008 |

OTHER PUBLICATIONS

Dupre et al., Positive Electrode Materials for Lithium Batteries Based on $VOPO_4$, Solid State Ionics 140, Jan. 21, 2001, pp. 209-221, Elsevier Science B.V., Paris, France.
Dupre et al., Electrochemical Performance of Different $Li-VOPO_4$ Systems, Journal of Power Sources 97-98, Dec. 4, 2000, pp. 532-534, Elsevier Science B.V., Paris, France.
Barker et al., Electrochemical Properties of $Beta-LiVOPO_4$ Prepared by Carbothermal Reduction, Journal of The Electrochemical Society, 151, Apr. 26, 2004, pp. A796-A800, The Electrochemical Society, Inc.
Feb. 5, 2013 Notification of Second Office Action issued in Chinese Application No. 201010134562.7.

* cited by examiner

*Primary Examiner* — Stuart Hendrickson
(74) *Attorney, Agent, or Firm* — Oliff & Berridge, PLC

(57) ABSTRACT

The present invention provides a method of manufacturing an active material comprising both $\alpha$-$LiVOPO_4$ and $\beta$-$LiVOPO_4$. The method of manufacturing an active material in accordance with the present invention comprises a hydrothermal synthesis step of heating a mixture containing a lithium source, a phosphate source, a vanadium source, and water and having a pH greater 7 but smaller than 12.7; and a firing step of firing the mixture after being heated under pressure in the hydrothermal synthesis step.

13 Claims, 1 Drawing Sheet

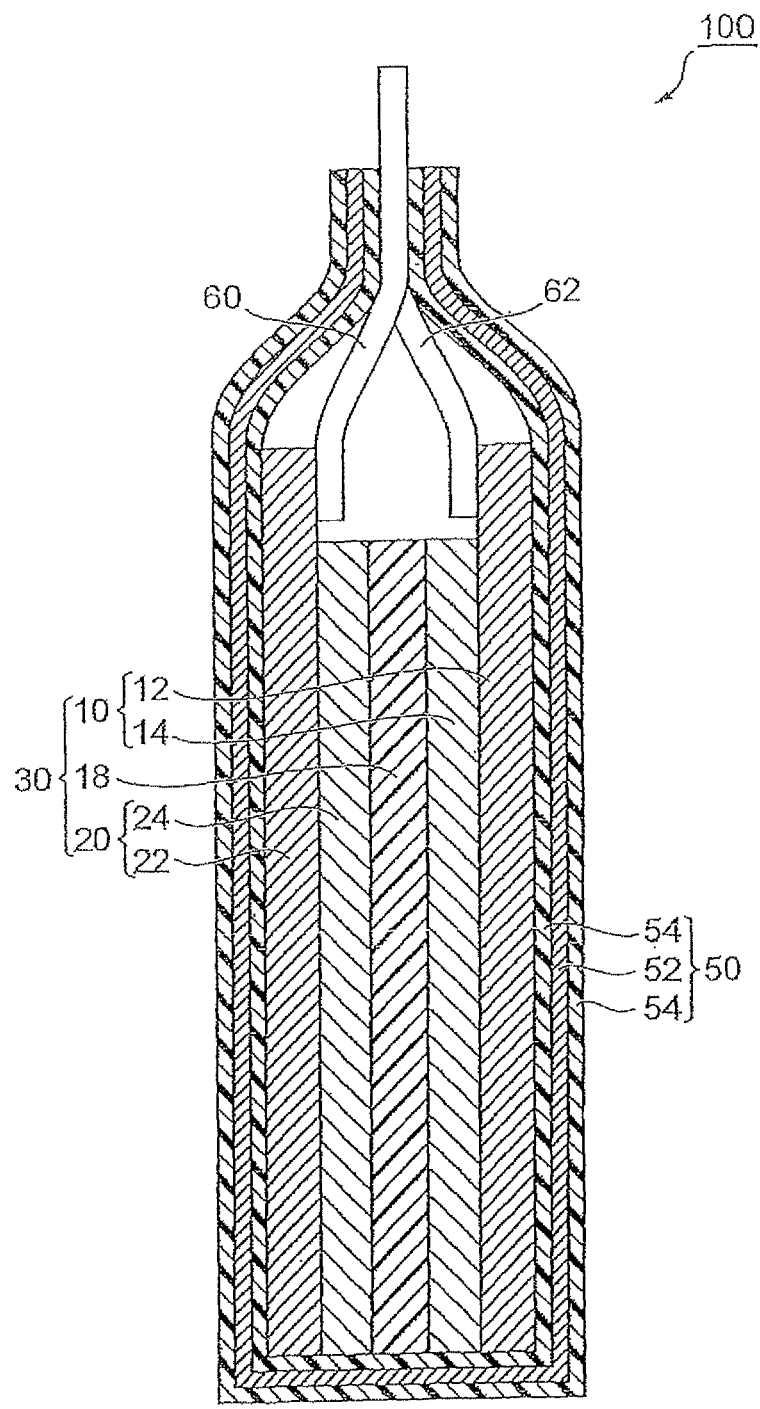

METHOD OF MANUFACTURING ACTIVE MATERIAL, ACTIVE MATERIAL, ELECTRODE, AND LITHIUM-ION SECONDARY BATTERY

BACKGROUND OF THE INVENTION

1. Field of the Invention

The present invention relates to a method of manufacturing an active material, an active material, an electrode, and a lithium-ion secondary battery.

2. Related Background Art $LiVOPO_4$, which is a positive electrode active material capable of reversibly inserting and desorbing lithium ions, is used for active material layers in lithium-ion secondary batteries. $LiVOPO_4$ has been known to exhibit a plurality of crystal structures such as those of triclinic ($\alpha$-type) and orthorhombic ($\beta$-type) crystals and have different electrochemical characteristics depending on their crystal structures (see Japanese Patent Application Laid-Open Nos. 2004-303527 and 2003-68304, Solid State Ionics, 140, pp. 209-221 (2001), J. Power Sources, 97-98, pp. 532-534 (2001), and J. Baker et al., J. Electrochem. Soc., 151, A796 (2004)).

SUMMARY OF THE INVENTION

The $\alpha$-type crystal of $LiVOPO_4$ (which will hereinafter be referred to as "$\alpha$-$LiVOPO_4$" when appropriate) is more thermodynamically stable than the $\beta$-type crystal of $LiVOPO_4$ (which will hereinafter be referred to as "$\beta$-$LiVOPO_4$" when appropriate). Therefore, batteries using $\alpha$-$LiVOPO_4$ as an active material are superior to those using $\beta$-$LiVOPO_4$ in terms of heat resistance.

On the other hand, $\beta$-$LiVOPO_4$ has ion conduction paths shorter and more linear than those of $\alpha$-$LiVOPO_4$ and thus is superior thereto in terms of the characteristic of reversibly inserting and desorbing lithium ions (which will hereinafter be referred to as "reversibility" when appropriate). Therefore, batteries using $\beta$-$LiVOPO_4$ as an active material have a larger capacity and better rate and cycle characteristics than those of batteries using $\alpha$-$LiVOPO_4$.

Lithium-ion secondary batteries require not only a heat resistance but also a large charge/discharge capacity and excellent rate and cycle characteristics. Therefore, an active material having both the excellent thermal stability of $\alpha$-$LiVOPO_4$ and the excellent reversibility of $\beta$-$LiVOPO_4$ is demanded as one for use in lithium-ion secondary batteries.

However, as can be inferred from the fact that $\alpha$-$LiVOPO_4$ is more thermally stable than $\beta$-$LiVOPO_4$, the conventional methods of synthesizing $LiVOPO_4$ tend to produce $\alpha$-$LiVOPO_4$ more likely than $\beta$-$LiVOPO_4$. Therefore, it has been difficult for the conventional methods of manufacturing an active material to yield an active material comprising both $\alpha$-$LiVOPO_4$ excellent in thermal stability and $\beta$-$LiVOPO_4$ excellent in reversibility in a favorable balance.

In view of the problems of the prior art mentioned above, it is an object of the present invention to provide a method of manufacturing an active material comprising both $\alpha$-$LiVOPO_4$ and $\beta$-$LiVOPO_4$, an active material obtained by the method of manufacturing an active material and capable of improving the heat resistance and discharge capacity of a lithium-ion secondary battery, an electrode using the active material, and a lithium-ion secondary battery using the electrode.

For achieving the object, the method of manufacturing an active material in accordance with the present invention comprises a hydrothermal synthesis step of heating a mixture containing a lithium source, a phosphate source, a vanadium source, and water and having a pH greater 7 but smaller than 12.7; and a firing step of firing the mixture after being heated under pressure in the hydrothermal synthesis step.

The method of the present invention makes it possible to yield a particle group containing $LiVOPO_4$. Since the mixture as a starting material for the hydrothermal synthesis has a pH greater than 7 but smaller than 12.7, the $\alpha$-type crystal phase of $LiVOPO_4$ (which will hereinafter be referred to as "$\alpha$-phase" when appropriate) and the $\beta$-type crystal phase of $LiVOPO_4$ (which will hereinafter be referred to as "$\beta$-phase" when appropriate) can coexist in the particle group containing $LiVOPO_4$. When the pH of the material as the starting material for the hydrothermal synthesis is regulated within the range of greater than 7 but smaller than 12.7, the ratio $\alpha/\beta$ between the number of moles a of the $\alpha$-type crystal phase of $LiVOPO_4$ existing in the particle group containing $LiVOPO_4$ and the number of moles $\beta$ of the $\beta$-type crystal phase of $LiVOPO_4$ existing in the active material can be adjusted freely within the range of 0.1 to 10.

In the following, the particle group containing $LiVOPO_4$ in which the ratio $\alpha/\beta$ between the number of moles a of the $\alpha$-type crystal phase of $LiVOPO_4$ existing in the particle group and the number of moles $\beta$ of the $\beta$-type crystal phase of $LiVOPO_4$ existing in the particle group is 0.1 to 10 will be referred to as "$\alpha\beta$ particle group".

Preferably, in the method of manufacturing an active material in accordance with the present invention, a basic reagent is added to the mixture before heating in the hydrothermal synthesis step. Preferably, the basic reagent is aqueous ammonia.

This makes it easier to adjust the pH of the unheated mixture to a desirable value greater than 7 but smaller than 12.7. The pH adjustment becomes easier in particular when aqueous ammonia is used as the basic reagent.

Preferably, in the method of manufacturing an active material in accordance with the present invention, the lithium source is at least one of $Li_2CO_3$ and $LiNO_3$, the phosphate source is at least one of $H_3PO_4$ and $(NH_4)_2HPO_4$, and the vanadium source is at least one of $V_2O_5$ and $NH_4VO_3$.

An appropriate combination of the lithium, phosphate, and vanadium sources makes it easier to adjust the pH of the mixture to a value greater than 7 but smaller than 12.7 and synthesize the $\alpha\beta$ particle group.

Preferably, in the hydrothermal synthesis step, a carbon particle is added to the mixture before heating.

This improves the electric conductivity of the resulting active material.

The active material in accordance with the present invention comprises a particle group containing $LiVOPO_4$, while the number of moles a of the $\alpha$-type crystal phase of $LiVOPO_4$ existing in the particle group and the number of moles $\beta$ of the $\beta$-type crystal phase of $LiVOPO_4$ existing in the particle group have a ratio $\alpha/\beta$ of 0.1 to 10. That is, the active material in accordance with the present invention comprises the above-mentioned $\alpha\beta$ particle group.

The electrode in accordance with the present invention comprises a current collector and an active material layer, disposed on the current collector, containing the active material in accordance with the present invention.

The lithium-ion secondary battery in accordance with the present invention comprises the electrode in accordance with the present invention.

The $\alpha$-phase excellent in the thermal stability and the $\beta$-phase excellent in reversibility (Li ion release and uptake efficiencies) coexist at the above-mentioned ratio $\alpha/\beta$ in the particle group in the active material in accordance with the present invention. This allows the active material in accordance with the present invention to have thermal stability and reversibility in a favorable balance. Therefore, the heat resistance and discharge capacity improve in the lithium-ion secondary battery using the active material in accordance with the present invention.

The advantageous effects of the present invention are hard to obtain when the α- and β-phases simply coexist in the particle group. When the ratio α/β is smaller than 0.1, the heat resistance and discharge capacity of the lithium-ion secondary battery decrease. When the ratio α/β is greater than 10, the discharge capacity of the lithium-ion secondary battery decreases. In contrast, by adjusting the ratio cup α/β such as to make it fall within the range of 0.1 to 10, the present invention can satisfy both the heat resistance and discharge capacity for the first time.

The inventors consider that the fact that the α- and β-phases coexist uniformly also contributes to improving the heat resistance and discharge capacity. That is, the inventors think that, while the conventional methods of manufacturing an active material are hard to synthesize an active material in which the α- and β-phases coexist uniformly, the method of manufacturing an active material in accordance with the present invention can synthesize the αβ particle group in which the α- and β-phases coexist uniformly.

Preferably, the active material in accordance with the present invention further comprises a carbon particle, while at least a part of the particle group is supported by the carbon particle.

This improves the electric conductivity of the active material, thereby making it easier for the lithium-ion secondary battery to improve its discharge capacity.

The present invention can provide a method of manufacturing an active material comprising both α-$LiVOPO_4$ and β-$LiVOPO_4$, an active material obtained by the method of manufacturing an active material and capable of improving the heat resistance and discharge capacity of a lithium-ion secondary battery, an electrode using the active material, and a lithium-ion secondary battery using the electrode.

BRIEF DESCRIPTION OF THE DRAWINGS

FIG. 1 is a schematic sectional view of a lithium-ion secondary battery comprising an active material layer containing an active material in accordance with an embodiment of the present invention.

DESCRIPTION OF THE PREFERRED EMBODIMENTS

Method of Manufacturing Active Material

In the following, a method of manufacturing an active material in accordance with an embodiment of the present invention will be explained.

The method of manufacturing an active material in accordance with this embodiment comprises a hydrothermal synthesis step of heating a mixture containing a lithium source, a phosphate source, a vanadium source, and water and having a pH greater 7 but smaller than 12.7; and a firing step of firing the mixture after being heated under pressure in the hydrothermal synthesis step.

Hydrothermal Synthesis Step

First, in the hydrothermal synthesis step, the above-mentioned lithium source, phosphate source, vanadium source, and water are put into a reaction vessel having a function of heating and pressurizing the inside thereof (e.g., autoclave), so as to prepare a mixture (aqueous solution) having them dispersed therein. For preparing the mixture, a mixture of the phosphate source, vanadium source, and water may be refluxed at first before adding the lithium source thereto, for example. The reflux can form a complex of the phosphate and vanadium sources.

The pH of the mixture is adjusted to a value greater than 7 but smaller than 12.7. This makes it possible to synthesize the αβ particle group. The pH of the mixture is preferably adjusted to 7.5 to 12.5, more preferably 9.3 to 12.1. This makes it easier to synthesize the αβ particle group, whereby a lithium-ion secondary battery using the αβ particle group as an active material is easier to improve its discharge capacity. When the pH of the mixture is too low, the β-phase tends to occur in excess, while making it harder for the α-phase to produce. When the pH of the mixture is too high, the α-phase tends to occur in excess, while making it harder for the β-phase to produce.

While various methods can be employed for adjusting the pH of the mixture to a value greater than 7 but smaller than 12.7, a basic reagent is preferably added to the mixture. Aqueous ammonia is preferred as the basic reagent. The amount of addition of the basic reagent may be adjusted appropriately according to the amount of the mixture and the species and compounding ratios of the lithium, phosphate, and vanadium sources.

As the lithium source, at least one species selected from the group consisting of $LiNO_3$, $Li_2CO_3$, LiOH, LiCl, $Li_2SO_4$, and $CH_3COOLi$ can be used.

As the phosphate source, at least one species selected from the group consisting of $H_3PO_4$, $NH_4H_2PO_4$, $(NH_4)_4HPO_4$, and $Li_3PO_4$ can be used.

As the vanadium source, at least one species selected from the group consisting of $V_2O_5$ and $NH_4VO_3$ can be used.

Preferably used among the above-mentioned compounds are at least one of $Li_2CO_3$ and $LiNO_3$ as the lithium source, at least one of $H_3PO_4$ and $(NH_4)_2HPO_4$ as the phosphate source, and at least one of $V_2O_5$ and $NH_4VO_3$ as the vanadium source. Containing a combination of these lithium, phosphate, and vanadium sources makes it easier for the mixture to adjust its pH to a value greater than 7 but smaller than 12.7, whereby the αβ particle group is easier to synthesize. Two or more species of lithium sources, two or more species of phosphate sources, or two or more species of vanadium sources may be used together.

The compounding ratio of the lithium, phosphate, and vanadium sources may be adjusted such that the resulting particle group attains the composition expressed by $LiVOPO_4$. For example, $Li_2CO_3$, $V_2O_5$, and $H_3PO_4$ may be compounded at a ratio of 1:1:2.

Preferably, a carbon particle is added to the mixture. This makes it possible to produce at least a part of the αβ particle group on the surface of the carbon particle and cause the carbon particle to support the αβ particle group. As a result, thus obtained active material can improve its electric conductivity.

While examples of the substance constituting the carbon particle include activated carbon, carbon black (graphite), hard carbon, and soft carbon, activated carbon or carbon black is preferably used among them. This makes it easier to improve the electric conductivity of the active material. Using acetylene black as carbon black makes it easier to improve the electric conductivity of the active material.

Next, the reaction vessel is closed, and the mixture is heated under pressure, so that a hydrothermal reaction of the mixture proceeds. This hydrothermally synthesizes a precursor of the αβ particle group.

Preferably, the pressure applied to the mixture in the hydrothermal synthesis step is 0.2 to 1 MPa. When the pressure applied to the mixture is too low, the finally obtained αβ particle group tends to lower its crystallinity, thereby decreasing the capacity density of the active material. When the pressure applied to the mixture is too high, the reaction vessel tends to require a high pressure resistance, thereby increasing the cost for manufacturing the active material. These tendencies can be suppressed when the pressure applied to the mixture falls within the range mentioned above.

Preferably, the temperature of the mixture in the hydrothermal synthesis step is 150 to 200° C. When the temperature of the mixture is too low, the finally obtained αβ particle group tends to lower its crystallinity, thereby decreasing the capacity density of the active material. When the temperature of the mixture is too high, the reaction vessel tends to require a high heat resistance, thereby increasing the cost for manufacturing the active material. These tendencies can be suppressed when the temperature of the mixture falls within the range mentioned above.

Firing Step

In the firing step, the mixture (precursor of the αβ particle group) after being heated under pressure in the hydrothermal synthesis step is fired. This yields the αβ particle group.

Preferably, the firing temperature of the mixture in the firing step is 400 to 700° C. When the firing temperature is too low, the crystal growth of α- and β-phases tends to become insufficient, thereby lowering the capacity density of the active material. When the firing temperature is too high, the α- and β-phases tend to grow in excess, so that the αβ particle group increases its crystal size, thereby retarding the diffusion of lithium in the active material and lowering the capacity density of the active material. These tendencies can be suppressed when the firing temperature falls within the range mentioned above.

Preferably, the firing time for the mixture is 3 to 20 hr. Preferably, the firing atmosphere for the mixture is a nitrogen, argon, or air atmosphere.

The mixture obtained in the hydrothermal synthesis step may be heat-treated for about 1 to 30 hr at a temperature of about 60 to 150° C. before firing in the firing step. The heat treatment turns the mixture into a powder. Thus obtained powdery mixture may be fired. This can remove surplus moisture and organic solvent from the mixture, prevent the α- and β-phases from taking up impurities, and homogenize particle forms.

The method of manufacturing an active material in accordance with this embodiment synthesizes the αβ particle group by a combination of the hydrothermal synthesis step and firing step, and thus allows the αβ particle group to have a volume-average primary particle size of 50 to 1000 nm and a sharper particle size distribution.

Examples of conventionally known methods of manufacturing an active material include one mixing, pulverizing, and firing solids to become materials for $LiVOPO_4$, so as to form particles of $LiVOPO_4$, and then mixing them with carbon; and one dissolving materials for $LiVOPO_4$ into water and drying them by evaporation, so as to form particles of $LiVOPO_4$, and then mixing them with carbon. These methods, however, are hard to synthesize the particle group having the ratio α/β falling within the range of 0.1 to 10, not to mention to reduce the volume-average primary particle size of the αβ particle group such that it falls within the range of 50 to 1000 nm.

Active Material

The active material in accordance with an embodiment of the present invention will now be explained. The active material in accordance with this embodiment can be manufactured by the above-mentioned method of manufacturing an active material.

The active material in accordance with this embodiment comprises a particle group containing $LiVOPO_4$, while the number of moles α of the α-phase existing in the particle group and the number of moles β of the β-phase existing in the particle group have a ratio α/β of 0.1 to 10. That is, the active material in accordance with this embodiment comprises the above-mentioned αβ particle group. The ratio α/β can be determined by a Rietveld analysis based on powder X-ray diffraction (XRD). When the αβ particle group having the ratio α/β of 0.1 to 10 is used as a positive electrode active material for a lithium-ion secondary battery, the effect of improving the discharge capacity of the lithium-ion secondary battery becomes remarkable.

The volume-average primary particle size of the αβ particle group is preferably 50 to 1000 nm, more preferably 100 to 500 nm. The volume-average primary particle size of the αβ particle group may be measured by a laser scattering method. The αβ particle group having a volume-average primary particle size of 50 to 1000 nm is finer than the conventional $LiVOPO_4$ particle groups. This increases the density of the ion conduction paths in the αβ particle group and shortens the Li ion diffusion length within particles, thereby enhancing the diffusing capacity of Li ions as compared with the conventional active materials. When made finer, the αβ particle group attains a specific surface area greater than that conventionally available. This improves the reversibility and increases the contact area between the current collector and αβ particle group and the contact area between a carbon particle (conductive agent) and the αβ particle group supported by the carbon particle, thereby raising the density of electron conduction paths in the active material.

Because of the foregoing reasons, the ionic and electronic conductivities and capacity density in the active material are improved over the conventional active materials when the volume-average primary particle size of the αβ particle group is 50 to 1000 nm. As a result, the lithium-ion secondary battery using this active material is easier to improve the discharge capacity and the rate and cycle characteristics over those using the conventional $LiVOPO_4$ particle groups.

When the volume-average primary particle size of the αβ particle group is too small, the discharge capacity tends to decrease. When the volume-average primary particle size of the αβ particle group is too large, the reversibility, Li ion diffusing capacity, and densities of ion and electron conduction paths tend to decrease. These tendencies can be suppressed in this embodiment when the volume-average primary particle size of the αβ particle group falls within the range mentioned above.

Preferably, the specific surface area of the αβ particle group is 1 to 10 $m^2/g$. When the specific surface area is too small, the reversibility, Li ion diffusing capacity, and densities of ion and electron conduction paths tend to decrease. When the specific surface area is too large, the active material and battery tend to lower their heat resistance. These tendencies can be suppressed in this embodiment when the specific surface area of the αβ particle group falls within the range mentioned above. The specific surface area may be measured by a BET method.

Lithium-Ion Secondary Battery

As illustrated in FIG. 1, a lithium-ion secondary battery 100 mainly comprises a multilayer body 30, a case 50 accommodating the multilayer body 30 in a closed state, and a pair of leads 60, 62 connected to the multilayer body 30. The multilayer body 30 is one in which a pair of electrodes 10, 20 oppose each other through a separator 18 interposed therebetween. The positive electrode 10 has a positive electrode current collector 12 and a positive electrode active material layer 14 formed on the positive electrode current collector 12. The negative electrode 20 has a negative electrode current collector 22 and a negative electrode active material layer 24 formed on the negative electrode current collector 22. The separator 18 is positioned between the negative electrode active material layer 25 and positive electrode active material layer 14. The positive electrode active material layer 14, negative electrode active material layer 24, and separator 18 contain an electrolytic solution therewithin. The leads 60, 62 are connected to respective end parts of the negative electrode current collector 22 and positive electrode current collector 12 and each have an end portion extending to the outside of the case 50. The case 50 seals the multilayer body 30 and electrolytic solution therewithin. The case 50 is not limited in particular as long as it can inhibit the electrolytic solution from leaking out therefrom and moisture and the like from invading the lithium-ion secondary battery 100 from the outside. For example, a metal-laminated film in which a metal foil 52 is coated with polymer films 54 on both sides can be utilized as the case 50.

The positive electrode active material layer 14 contains the αβ particle group.

Since the positive electrode active material layer 14 contains the αβ particle group in which the α-phase excellent in thermal stability and the β-phase excellent in reversibility article group coexist at the above-mentioned ratio α/β, the lithium-ion secondary battery can satisfy the heat resistance, discharge capacity, and rate and cycle characteristics at the same time in this embodiment.

Preferably, the αβ particle group content in the positive electrode active material layer 14 is 80 to 97 mass %. When the αβ particle group content is too small, the heat resistance and discharge capacity of the battery tend to decrease. When the αβ particle group content is too large, the conductive agent tends to reduce its share in the positive electrode active material layer, thereby lowering the electronic conductivity in the positive electrode active material layer. These tendencies can be suppressed in this embodiment when the αβ particle group content in the positive electrode active material layer falls within the range mentioned above.

Though a preferred embodiment of the active material and method of manufacturing an active material in accordance with the present invention is explained in detail in the foregoing, the present invention is not limited to the above-mentioned embodiment.

For example, the active material can also be used as an electrode material for electrochemical devices other than the lithium-ion secondary battery. Examples of such electrochemical devices include secondary batteries other than the lithium-ion secondary battery, e.g., metallic lithium secondary batteries (using an electrode containing the active material of the present invention as a cathode and metallic lithium as an anode), and electrochemical capacitors such as lithium capacitors. These electrochemical devices can be used for power supplies for self-propelled micromachines, IC cards, and the like and decentralized power supplies placed on or within printed boards.

EXAMPLES

The present invention will now be explained more specifically with reference to examples and comparative examples, but will not be limited to the following examples.

Example 1

Hydrothermal Synthesis Step

Into a 1.5-L autoclave vessel, 23.11 g (0.2 mol) of an aqueous $H_3PO_4$ solution (special grade having a molecular weight of 98.00 and a purity of 85 wt % manufactured by Nacalai Tesque, Inc.), 503 g of $H_2O$ (for HPLC (high-performance liquid chromatography), manufactured by Nacalai Tesque, Inc.), 18.37 g (0.1 mol) of $V_2O_5$ (special grade having a molecular weight of 181.88 and a purity of 99 wt % manufactured by Nacalai Tesque, Inc.), and 7.39 g (0.1 mol) of $Li_2CO_3$ (special grade having a molecular weight of 73.89 and a purity of 99 wt % manufactured by Nacalai Tesque, Inc.) were introduced in this order, and then 36.60 g (0.6 mol) of an aqueous $NH_3$ solution (special grade having a molecular weight of 17.03 and a purity of 28 wt % manufactured by Nacalai Tesque, Inc.) were gradually added dropwise thereto with a dropper, so as to prepare a mixture. These amounts of materials correspond to those for stoichiometrically generating about 30 g (0.2 mol) of $LiVOPO_4$ (having a molecular weight of 168.85). The dropwise addition of the aqueous $NH_3$ solution raised the temperature within the vessel by about 6° C. from 20.8° C. to 26.5° C.

With the vessel closed, the mixture was stirred for about 30 min at room temperature, and then was refluxed at 160° C./200 rpm for 16 hr under a pressure of 0.5 MPa within the vessel, so that a hydrothermal synthesis reaction proceeded.

After 16 hr of the reflux, the heating was stopped, and then the mixture was held within the vessel for about 4 hr, whereby the temperature within the vessel was lowered to 36.4° C. About 300 ml of water were added to thus cooled mixture, and then the mixture was transferred onto a tray and dried for about 25 hr at 90° C. by evaporation with an oven. After being dried by evaporation, the mixture was pulverized, so as to yield 44.84 g of an orange powder (precursor of an active material).

Firing Step

Using a heating furnace, 5.00 g of the precursor contained in an alumina crucible were fired for 4 hr at 600° C., and then naturally cooled in the furnace. The powder was fired in an air atmosphere. In the firing step, the firing temperature was raised from room temperature to 600° C. in 60 min. This firing step yielded 177 g of a green particle group (an active material of Example 1).

Measurement of the Crystal Structure

The result of Rietveld analysis based on powder X-ray diffraction (XRD) proved that the active material of Example 1 was a particle group of $LiVOPO_4$ and that the ratio α/β between the number of moles a of the α-phase existing in the particle group and the number of moles β of the β-phase existing in the particle group was 0.1 (see Table 1).

Making of the Evaluation Cell

The active material of Example 1 and a mixture of polyvinylidene fluoride (PVDF) as a binder and acetylene black were dispersed into N-methyl-2-pyrrolidone (NMP) acting as a solvent, so as to prepare a slurry. The slurry was prepared such that the weight ratio among the active material, acetylene black, and PVDF became 84:8:8 therein. The slurry was applied onto an aluminum foil acting as a current collector, dried, and then extended under pressure, so as to yield an electrode (positive electrode) formed with an active material layer containing the active material of Example 1.

Thus obtained electrode and an Li foil acting as its opposite electrode were subsequently laminated with a separator made of a microporous polyethylene film interposed therebetween, so as to yield a multilayer body (matrix). This multilayer body was put into an aluminum-laminated pack, a 1-M LiPF$_6$ solution was injected therein as an electrolytic solution, and then the pack was sealed in vacuum, so as to make an evaluation cell of Example 1.

Measurement of the Discharge Capacity

Using the evaluation cell of Example 1, the discharge capacity (unit: mAh/g) at a discharge rate of 0.1 C (the current value by which constant-current discharging at 25° C. completed in 10 hr) was measured. Table 1 represents the measured results.

Evaluation of the Heat Resistance

The evaluation cell of Example 1 was overcharged to 10 V at a current value of 3 C, and whether it smoked or not was determined. There was no smoke in Example 1 (see Table 1).

Example 2

In Example 2, the mixture before the hydrothermal synthesis reaction contained 14.07 g (0.2 mol) of LiNO$_3$ (special grade having a molecular weight of 68.95 and a purity of 98 wt % manufactured by Nacalai Tesque, Inc.) instead of Li$_2$CO$_3$. The mixture after the hydrothermal synthesis reaction was dried for about 23 hr by evaporation in Example 2. The mixture after being dried by evaporation was pulverized, so as to yield 60.23 g of a yellow powder (precursor of the active material). After firing the precursor of the active material, 2.86 g of a somber green particle group (active material) were obtained. Except for the foregoing matters, the active material and evaluation cell of Example 2 were obtained by the same method as that of Example 1.

Example 3

In Example 3, the mixture before the hydrothermal synthesis reaction contained 48.80 g (0.80 mol) of the aqueous NH$_3$ solution. The mixture after the hydrothermal synthesis reaction was dried for about 22 hr by evaporation in Example 3. The mixture after being dried by evaporation was pulverized, so as to yield 45.76 g of an orange powder (precursor of the active material). After firing the precursor of the active material, 3.75 g of a green particle group (active material) were obtained. Except for the foregoing matters, the active material and evaluation cell of Example 3 were obtained by the same method as that of Example 1.

Example 4

In Example 4, the aqueous NH$_3$ solution was added to the mixture before the hydrothermal synthesis reaction, so as to adjust the pH of the latter to 12.1. Except for this matter, the active material and evaluation cell of Example 4 were obtained by the same method as that of Example 1.

Example 5

In Example 5, the aqueous NH$_3$ solution was added to the mixture before the hydrothermal synthesis reaction, so as to adjust the pH of the latter to 12.3. Except for this matter, the active material and evaluation cell of Example 5 were obtained by the same method as that of Example 1.

Comparative Example 1

In Comparative Example 1, hydrochloric acid was added to the mixture before the hydrothermal synthesis reaction, so as to adjust the pH of the latter to 7.0. Except for this matter, the active material and evaluation cell of Comparative Example 1 were obtained by the same method as that of Example 1.

Comparative Example 2

In Comparative Example 2, a mixture was made by using 7.3 g of the aqueous NH$_3$ solution. Except for this matter, the active material and evaluation cell of Comparative Example 2 were obtained by the same method as that of Example 1.

Comparative Example 3

In Comparative Example 3, a mixture was made by using 60.8 g of the aqueous NH$_3$ solution. Except for this matter, the active material and evaluation cell of Comparative Example 3 were obtained by the same method as that of Example 1.

The pH of the mixture was measured before and after the hydrothermal synthesis reaction in each of Examples 1 to 5 and Comparative Examples 1 to 3 mentioned above. Table 1 lists the results. The crystal structure was analyzed in each of the active materials of Examples 2 to 5 and Comparative Example by the same method as that of Examples 1 to 3 and found to have the composition of LiVOPO$_4$. The ratio α/β in each of the active materials of Examples 2 to 5 and Comparative Examples 1 to 3 was determined by the same method as that of Example 1. Table 1 lists the results. The discharge capacity in each of the evaluation cells of Examples 2 to 5 and Comparative Examples 1 to 3 was determined by the same method as that of Example 1. Whether the evaluation cell smoked or not was determined in each of Examples 2 to 5 and Comparative Examples 1 to 3 by the same method as that of Example 1. Table 1 lists the results.

TABLE 1

| | pH of mixture | | | | |
| | Before hydrothermal synthesis reaction | After hydrothermal synthesis reaction | α/β | Discharge capacity (mAh/g) | Smoke |
|---|---|---|---|---|---|
| Example 1 | 8.0 | 4.5 | 0.1 | 84 | no |
| Example 2 | 11.0 | 6.8 | 4 | 88 | no |
| Example 3 | 9.3 | 5.4 | 0.5 | 95 | no |
| Example 4 | 12.1 | 8.1 | 5 | 92 | no |
| Example 5 | 12.3 | 8.2 | 10 | 85 | no |
| Comparative Example 1 | 7.0 | 4.3 | 0.08 | 77 | no |
| Comparative Example 2 | 5.5 | 3.0 | 0.01 | 99 | yes |
| Comparative Example 3 | 12.7 | 8.7 | 11 | 71 | no |

As Table 1 represents, the ratio α/β was seen to fall within the range of 0.1 to 10 in each of the active materials of Examples 1 to 5 in which the pH of the mixture before the hydrothermal synthesis reaction was greater than 7 but smaller than 12.7. On the other hand, the ratio α/β was seen to be smaller than 0.1 in each of the active materials of Comparative Examples 1 and 2 in which the pH of the mixture before the hydrothermal synthesis reaction was 7 or less. The ratio α/β was seen to be greater than 10 in Comparative Example 3 in which the pH was 12.7.

Each of the evaluation cells of Examples 1 to 5 was seen to have a discharge capacity greater than that of each of Comparative Examples 1 and 3. The evaluation cells of Examples 1 to 5 exhibited no smoke and thus were verified to be excellent in heat resistance.

The evaluation cell of Comparative Example 2 generated heat and smoked. From this fact, the evaluation cell of Comparative Example 2 was seen to be inferior to Examples 1 to 5 in terms of heat resistance.

REFERENCE SIGNS LIST

10 . . . positive electrode; 20 . . . negative electrode; 12 . . . positive electrode current collector; 14 . . . positive electrode active material layer; 18 . . . separator; 22 . . . negative electrode current collector; 24 . . . negative electrode active material layer; 30 . . . multilayer body; 50 . . . case; 52 . . . metal foil; 54 . . . polymer film; 60, 62 . . . dead; secondary battery

What is claimed is:

1. A method of manufacturing an active material that comprises $LiVOPO_4$, the method comprising:
    a hydrothermal synthesis step of heating a mixture containing:
       a lithium source,
       a phosphate source,
       a vanadium source, and
       water,
    the mixture having a pH greater than 7 but less than 12.7; and
    a firing step of firing the mixture after being heated under pressure in the hydrothermal synthesis step.

2. The method of manufacturing an active material according to claim 1, further comprising adding a basic reagent to the mixture before the mixture is heated in the hydrothermal synthesis step.

3. The method of manufacturing an active material according to claim 2, wherein the basic reagent is aqueous ammonia.

4. The method of manufacturing an active material according to claim 1, wherein:
    the lithium source is at least one of $Li_2CO_3$ and $LiNO_3$;
    the phosphate source is at least one of $H_3PO_4$ and $(NH_4)_2HPO_4$; and
    the vanadium source is at least one of $V_2O_5$ and $NH_4VO_3$.

5. The method of manufacturing an active material according to claim 1, further comprising, in the hydrothermal synthesis step, adding a carbon particle to the mixture before the mixture is heated.

6. An active material comprising a particle group containing $LiVOPO_4$, wherein a number of moles $\alpha$ of an $\alpha$-type crystal phase of $LiVOPO_4$ existing in the particle group and a number of moles $\beta$ of a $\beta$-type crystal phase of $LiVOPO_4$ existing in the particle group have a ratio $\alpha/\beta$ of 0.1 to 10.

7. The active material according to claim 6, further comprising a carbon particle; wherein at least a part of the particle group is supported by the carbon particle.

8. An electrode comprising:
    a current collector; and
    an active material layer, disposed on the current collector, containing the active material according to claim 6.

9. A lithium-ion secondary battery comprising the electrode according to claim 8.

10. A method of manufacturing an active material, the method comprising:
    a hydrothermal synthesis step of heating a mixture containing a lithium source, a phosphate source, a vanadium source, and water and having a pH greater than 7 but smaller than 12.7; and
    a firing step of firing the mixture after being heated under pressure in the hydrothermal synthesis step;
    wherein a basic reagent is added to the mixture before being heated in the hydrothermal synthesis step.

11. The method of manufacturing an active material according to claim 10, wherein the basic reagent is aqueous ammonia.

12. The method of manufacturing an active material according to claim 10, wherein:
    the lithium source is at least one of $Li_2CO_3$ and $LiNO_3$;
    the phosphate source is at least one of $H_3PO_4$ and $(NH_4)_2HPO_4$; and
    the vanadium source is at least one of $V_2O_5$ and $NH_4VO_3$.

13. The method of manufacturing an active material according to claim 10, further comprising, in the hydrothermal synthesis step, adding a carbon particle to the mixture before the mixture is heated.

* * * * *